US 6,735,533 B2

(12) United States Patent
McClure et al.

(10) Patent No.: US 6,735,533 B2
(45) Date of Patent: May 11, 2004

(54) ONLY PICKED UP PHASES RECLOSER CONTROL

(75) Inventors: Graeme N. McClure, Highett Victoria (AU); Carl J. LaPlace, Raleigh, NC (US); David G. Hart, Raleigh, NC (US); William M. Egolf, Apex, NC (US)

(73) Assignee: ABB Technology AG, Zurich (CH)

( * ) Notice: Subject to any disclaimer, the term of this patent is extended or adjusted under 35 U.S.C. 154(b) by 333 days.

(21) Appl. No.: 09/810,352

(22) Filed: Mar. 16, 2001

(65) Prior Publication Data

US 2002/0131222 A1 Sep. 19, 2002

(51) Int. Cl.$^7$ .............................................. G01R 31/00
(52) U.S. Cl. ............................ 702/58; 361/61; 361/71; 361/72; 361/73; 361/74; 361/75
(58) Field of Search ............................ 702/58; 361/61, 361/71–75

(56) References Cited

U.S. PATENT DOCUMENTS

| | | | |
|---|---|---|---|
| 2,320,861 A | * | 6/1943 | Goldborough ............... 361/61 |
| 2,539,416 A | * | 1/1951 | Blackburn et al. ............ 361/61 |
| 3,558,985 A | * | 1/1971 | Krolski et al. ................ 361/61 |
| 4,086,568 A | | 4/1978 | Watts, Jr. et al. ....... 340/147 R |
| 4,466,071 A | | 8/1984 | Russell, Jr. .................. 364/492 |
| 4,535,409 A | | 8/1985 | Jindrick et al. ............. 364/481 |
| 4,912,591 A | * | 3/1990 | LeCourt ...................... 361/75 |
| 5,029,039 A | | 7/1991 | Yeh .............................. 361/59 |
| 5,091,616 A | | 2/1992 | Ramos et al. ........... 200/146 R |
| 5,241,444 A | | 8/1993 | Yeh .............................. 361/59 |
| 5,303,112 A | | 4/1994 | Zulaski et al. ................ 361/67 |
| 5,506,789 A | | 4/1996 | Russell et al. .............. 364/492 |
| 5,550,751 A | | 8/1996 | Russell ........................ 364/492 |
| 5,638,296 A | | 6/1997 | Johnson et al. ............. 364/492 |
| 5,650,728 A | | 7/1997 | Rhein et al. ................. 324/543 |
| 5,659,453 A | | 8/1997 | Russell et al. ................ 361/93 |
| 5,768,079 A | * | 6/1998 | Buell ............................ 361/78 |
| 5,822,165 A | | 10/1998 | Moran .......................... 361/78 |
| 5,912,604 A | | 6/1999 | Harvey et al. ................. 335/9 |
| 6,018,449 A | | 1/2000 | Nelson et al. ................ 361/66 |

OTHER PUBLICATIONS

VR–3S Recloser 15–38kV brochure, ABB Distrubution Automation Equipment Division, Raleigh, NC, Descriptive Bulletin 38–741–27 (Jun. 1999).

* cited by examiner

Primary Examiner—John Barlow
Assistant Examiner—Anthony T. Dougherty
(74) Attorney, Agent, or Firm—Woodcock Washburn LLP

(57) ABSTRACT

A recloser trips on one phase for single-phase only fault conditions, two phases for two-phase fault conditions, or all three phases for three-phase fault conditions. During power delivery, the recloser monitors the three phases of a power line (e.g., phases A, B, and C). If a fault is detected on one phase, then a timer is started and subsequently decremented. If the timer finishes counting down while the fault is still present, then it is determined if any of the other two phases are timing a fault. If so, then those phases having a fault are tripped. Thus, only the faulted phase(s) is (are) tripped.

13 Claims, 2 Drawing Sheets

ONLY PICKED UP PHASES RECLOSER CONTROL

FIELD OF THE INVENTION

The present invention relates in general to the field of electrical power distribution systems. More particularly, the present invention relates to reclosers.

BACKGROUND OF THE INVENTION

A common problem in almost any electrical power distribution system is a momentary disruption of electrical service, such as might be caused by a momentary short circuit. For example, power lines strung between poles could swing under wind loading, momentary touching each other or a grounded conductor. Things may fall across exposed wires, arcing could occur, or other transitory events could cause momentary power line short circuits or current surges which could burn out a fuse or trip a circuit breaker. Most of these faults are self correcting and do not require permanent fuse or circuit breaker protection because they terminate quickly. If a fuse should burn out or a circuit breaker should trip, the power line would be open and customers would be deprived of their electrical power. Service calls to replace fuses or reset circuit breakers would then be required, thus escalating the customer's costs.

A recloser is a fault-interrupting device used to sense current, voltage, and/or frequency and isolate faulted portions of distribution feeders. A recloser is operated by a recloser control device, which can be an electronic control circuit. Reclosers are inserted into power lines to protect a power distribution system.

A recloser senses the peak value of the current conducted and interrupting its flow by opening or tripping a recloser before a fuse blows. After an interval, the recloser closes, thereby restoring power to the system where it remains closed until the next fault is sensed.

The rate at which a fuse will blow and interrupt current is a function of the thermal heating of the fusible element. The rate of thermal heating is proportional to the power generated by the fault and each fuse has a time current characteristic which describes the time interval required to interrupt the fault current. The time interval is generally approximately inversely proportional to the value of the root mean square of the fault current. It is desirable to coordinate the recloser with the fuses to be saved to insure that the recloser in fact interrupts temporary fault currents before the fuses to be protected are blown. This is generally done by approximating the root mean square value of the fault current by sensing its peak value.

It must also be recognized that some faults which occur on a power distribution line are temporary, such as those caused by a branch momentarily falling against the line. Some faults are of a more permanent nature such as those caused by a line falling to the ground. As a consequence, reclosers are programmed so that they will trip a limited number of times within a short duration before locking open.

At some magnitude of fault current it is desirable to have the recloser open immediately to protect the line rather than following a time current characteristic. At intermediate fault levels it may be desirable from the power distribution standpoint to delay opening the recloser to allow the fault to clear itself or a fuse to operate. Many reclosers have alternate time current characteristics which achieve this goal. Typically a recloser will allow two shots or trip operations to follow a fast time current characteristic and two additional shots along a somewhat slower time current characteristic before locking open or out.

Conventional reclosers for three-phase systems open all three phases at the same time upon detection of a fault on any one phase. Other three-phase systems implement three single-phase reclosers, one on each phase. In these systems, each single-phase recloser is independently controlled. This is costly and does not allow for the phases to be responsive to one another.

Thus, in a typical configuration, for a fault, the recloser will open to clear the fault. Note that for any fault, e.g. single-phase-to-ground faults, phase-to-phase faults, phase-to-phase-ground faults, and three-phase faults, a typical recloser will open all three phases. For single-phase feeders, opening all three phases for single-phase fault results in more customers losing power than necessary. However, if an electric utility were to employ traditional single-phase protection on their distribution system, it would be implemented with three single-phase mechanical reclosers—one for each phase. This provides per phase approach to single-phase faults but if there is an evolving fault, such as, for example, two or more phases are faulted, then the tripping and subsequent reclosing is also always done single-phase. Totally independent single-phase devices can also be involved in a race condition. For phase-to-phase faults, if one phase was to operate more quickly than the other, the recloser may not correctly isolate the second faulted phase.

It is thus desirable to provide recloser control that can overcome the problems of the prior art. In this way, an electric utility can protect for single-phase, two-phase, and three-phase faults using the same recloser.

SUMMARY OF THE INVENTION

The present invention is directed to recloser operation that is responsive to the prevailing fault conditions. An only picked up phases (OPUP) technique trips a recloser for only the phases that are in a fault condition (i.e., one phase gets tripped for single-phase only fault conditions, two phases get tripped for two-phase fault conditions, and three-phases get tripped for three-phase fault conditions.)

According to one embodiment within the scope of the present invention, a method for controlling a recloser for a three-phase electrical power line comprises monitoring the three phases of the power line, determining which of the three phases have an associated fault, and opening the phases on the power line that have the associated fault.

According to aspects of the invention, determining which of the three phases have an associated fault comprises comparing a line current through each of the three phases to a predetermined current. A fault occurs on one of the phases when the line current on the associated phase exceeds the predetermined current.

According to further aspects of the invention, determining which of the three phases have an associated fault comprises detecting a fault in at least one of the three phases, starting a countdown timer associated with each faulted phase, and determining the faults still present after one of the associated countdown timers has expired.

According to further aspects of the invention, opening the phases on the power line that have the associated fault comprises opening only one phase if only one fault is determined, the only one phase being associated with the fault, opening only two phases if only two faults are determined, the only two phases being associated with the two faults, and opening all three phases if three faults are determined.

According to another embodiment within the scope of the invention, a recloser control system for a three-phase electrical power line comprises a recloser having three poles, each pole corresponding to an associated one of the three phases of the power line and being capable of opening or closing the associated phase of the power line, and a recloser controller coupled to the recloser for controlling the setting of the poles depending on the line current appearing in the phases on the power line. One pole opens the associated phase of the power line if the line current on only the associated phase exceeds an associated predetermined current, two poles open the two associated phases of the power line if the line current on each of only two associated phases exceeds an associated predetermined current, and all poles open all the associated phases of the power line if the line current on three phases exceeds the associated predetermined current.

According to aspects of the invention, the recloser controller comprises a countdown timer for determining whether a phase that has entered a pickup state should be tripped.

The foregoing and other aspects of the present invention will become apparent from the following detailed description of the invention when considered in conjunction with the accompanying drawings.

DESCRIPTION OF EXEMPLARY
EMBODIMENTS AND BEST MODE

The present invention is directed to systems and methods for controlling a recloser so that it trips on one phase for single-phase only fault conditions, or all phases for multi-phase fault conditions.

Figure 1:
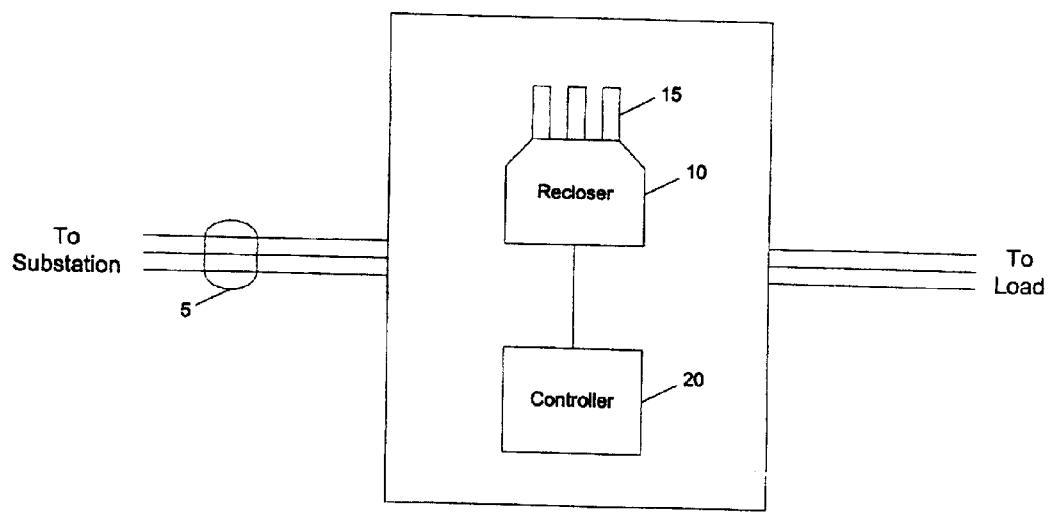
FIG. 1 is a simplified schematic diagram of a system in which the present invention may be embodied.

A simplified schematic diagram of a system in which the present invention may be embodied is shown in FIG. 1. A recloser 10 is a switch that opens and closes a power line 5 (e.g., between a substation and a load), and which is operated by a recloser control device 20 such as an electronic control circuit. It should be understood that the term "recloser" covers various combinations of reclosers, sectionalizers, circuit breakers and the like, which may also be used within the scope of this invention. The power line 5 is a three-phase power line. The recloser 10 comprises three poles 15. Each pole 15 is connected to an associated wire on the power line 5, thereby being energized by an associated phase. The recloser 10 could monitor system currents and voltages.

The basic components of an automatic recloser 10 are a high-speed circuit breaker, overcurrent protection, trip logic, and automatic closing logic with an operation counter. When an overcurrent of sufficient magnitude (i.e., greater than a predetermined amount of current) flows through the recloser 10, the tripping action is initiated and a circuit interrupting contact within the pole 15 opens with an operation counter advancing one count. After a preset time delay, the recloser contacts are automatically closed, thereby re-energizing the line 5. If the fault persists, this tripping and reclosing sequence is repeated a predetermined number of times, as set by the controller 20, until a lockout function is initiated. If the fault was transient and cleared during any period when the recloser 10 was open, then the recloser 20 will remain closed after a short time delay reset to its original condition ready for the next operation.

An exemplary recloser for use with the present invention is the VR-3S recloser manufactured and distributed by ABB Power T&D Company, Inc., Raleigh, N.C. Magnetic actuators open and close the recloser's main contacts.

The recloser 10 is controlled by microprocessor-based controller 20 that contains software. There are two basic design areas that make up a microprocessor-based controller 20. The physical elements, such as integrated circuits, resistors, capacitors, displays, switches, and so forth, are called "hardware". Once constructed, they are not readily changeable. The second basic design area in the microcomputer includes computer programs and documentation. These elements are called "software" since they are readily changeable.

A microcomputer based on a microprocessor and associated memories and interfacing components is used in the recloser controller 20 to process input signals in a manner appropriate to the basic requirement for a recloser control. The microprocessor performs the various arithmetic and logic functions of the control. In particular, the required logic circuits as well as capabilities for servicing are typically included.

A power supply is typically provided in a recloser control system and provides power to other components of the control system and includes power storage means to supply power when the protected lines are interrupted. A secondary overcurrent trip circuit in the control functions independently of the microcomputer when the microcomputer is disabled to effect a trip operation of the recloser. A protective input network protects the controller's low power devices from the hostile environment of the power distribution system and scaling means are used to allow the microcomputer and associated circuitry to function with more precision in the range of input signal magnitudes where precision is desirable and to allow the control to function with a limited number of components over a wide range of input signals.

Memory is provided for temporarily and/or permanently storing data. In a recloser 10, for example, this information would include line current magnitudes. ROM is preferably electrically programmable for easy modification and is used for storing programming information. In a recloser controller 20, for example, the memory module contains command information including multiple time-current characteristic curves.

The front panel of a recloser controller 20 may include a display for displaying information. A keyboard or other input device may be used for entering information. Indicator lamps provide status information such as recloser open, recloser closed, control lock out, above minimum trip, malfunction and lock in.

Through the use of the switches and keyboard mentioned above, the operations of the device can be controlled by command information. Typical command information for a recloser controller includes first time current characteristics for phase and ground currents which usually result in the more rapid tripping of the recloser 10, and second time current characteristics for phase and ground currents which usually result in the recloser 10 remaining closed longer under fault conditions. Other command information includes minimum trip levels for phase and ground currents which in a recloser controller begins the timing process in accordance with the time current characteristic, number of shots to lock out under phase and ground faults, and number of times which a given time current characteristic will be followed. Further command information may include a reset time interval which determines the duration which a counter recording the shot number will retain that information under non-fault conditions, and multiple reclose intervals which determine the time that the recloser 10 will remain open. Additional command information may include a high current constant time feature which allows the recloser 10 to remain closed only for a fixed duration under certain magnitudes of fault currents. Thus, if there is a fault, the line 5 is opened for a short period of time. At an end of a given time period following the opening of the line 5, the recloser 10 closes the line 5. If the abnormal condition persists, the recloser 10 again opens and closes the line 5.

It should be understood any of a number of microprocessors could be used to the same effect described above. Each manufacturer's family requires that the peculiarities of their devices be satisfied and in the microcomputer portion of the recloser controller 20, and it would be impossible to go into sufficient detail to describe the functioning control and be sufficiently general to adequately describe the use of alternative devices. One skilled in the art could readily amplify and modify the description given to make them applicable to the devices of other manufacturers by reading the normal technical literature provided by the manufacturer of another device. Moreover, it would be extremely confusing to attempt to describe all the minor details contained within the software and only the more general software modules and programs are described since one skilled in the art could readily flesh out the skeleton provided.

An exemplary control unit is the PCD2000 power control device manufactured and distributed by ABB Power T&D Company, Inc., Raleigh, N.C. The control device can provide an interface for remote communication with SCADA systems using MODBUS RTU, MODBUS ASCII, and DNP 3.0 protocols. The controller can be programmed to implement other protocols. Ports are available for external links through a radio, modem, or direct fiber optic communications, for example.

In accordance with the invention, each single phase is individually monitored and can be tripped through the protection elements on the phase that detects fault current (i.e., current above the pickup threshold level) to initiate a pole 15 to trip open. In determining if a single phase is faulted, a protection element within the recloser detects a fault condition. The protection element enters pickup, then after predetermined time elapses, a trip operation results. It is possible to trip any and all phases that are in the pickup state at the time trip is determined. In the only picked up phases (OPUP) process according to the present invention, if a single-phase fault is detected or picked up on one pole, a single-phase trip will occur. If two phases are detected to have faults (via phase or neutral detection), then the two poles and associated phases will trip, and if three phases pickup or detect a fault, then the controller will direct all three poles to trip.

Figure 2:
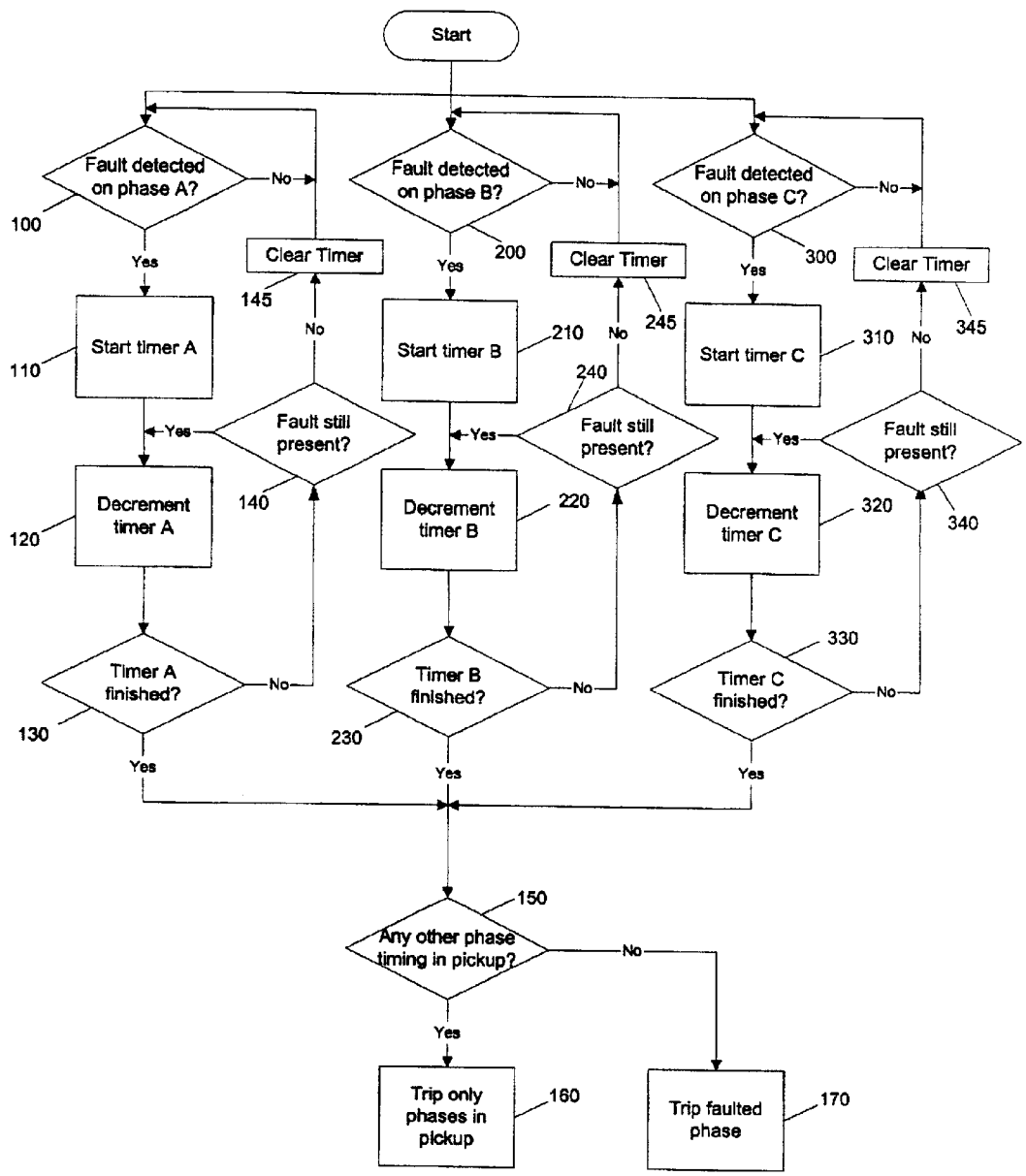
FIG. 2 is a flow chart of an exemplary method of operation in accordance with the present invention.

FIG. 2 is a flow chart of an exemplary method of operation in accordance with the present invention. During power delivery, the recloser 10 monitors the three phases of the power line 5 (e.g., phases A, B, and C). If a fault is detected on phase A, at step 100, then a timer is started at step 110 by the controller and subsequently decremented at step 120. It is determined at step 130 if the timer has finished counting down. If not, then it is determined at step 140 if the fault is still present. If the fault is not present (i.e., it has cleared), then the timer is cleared (i.e., re-set) at step 145, and monitoring resumes. If the fault is still present at step 140, then the timer continues to decrement at step 120.

If the timer has finished its predetermined time count at step 130 with the fault still being present, then it is determined at step 150 if any of the other two phases are timing a fault. If so, then those phases having a fault (e.g., in pickup or timed out beyond pickup) are tripped at step 160; otherwise, only the faulted phase (here, phase A) is tripped at step 170.

Similarly, for phases B and C, if a fault is detected (at steps 200 and 300, respectively), an associated timer is started (210, 310) and subsequently decremented (220, 320). It is determined if the timer has completed its countdown (230, 330). If not, then it is determined if the fault is still present (240, 340). If the fault is not present (i.e., it has cleared), then the associated timer is cleared (245, 345), and monitoring resumes. However, if the fault is still present, then the timer continues to decrement.

Similar to phase A, if the timer has finished its predetermined countdown with the fault still being present, then it is determined at step 150 if any of the other two phases are timing a fault. If so, then those phases having a fault (one, two, or three phases) are tripped at step 160;

otherwise, only the faulted phase is tripped at step 170. Thus, in accordance with the present invention, only those phases on the recloser that have a fault will be tripped. This is advantageous, if for example, a fault occurs only on phases A and B. In this case, only loads (customers) connected to phases A and B will experience an outage but the other phase (e.g., phase C) will not experience any interruption of power and will stay energized.

Moreover, each pole on the recloser is tripped (opened) independently if the controller detects a fault on only any one of the three phases. This is advantageous, if for example, a fault occurs only on phase A. In this case, only loads (customers) connected to phase A will experience an outage but the other two phases (e.g., phase B and phase C) will not experience any interruption of power and will stay energized.

The present invention provides a control capability function of the recloser to trip, reclose, and/or lockout whenever a fault is detected on one-phase independently, two-phases sequentially or three-phases simultaneously. This recloser control technique allows an electric utility to avoid unnecessary three-phase outages of their distribution network during an independent, single-phase, transient event, or a two-phase event. In this manner, all faulted phases are isolated.

Moreover, the present invention provides a level of protection, in that, if the independent single-phase transient fault were to evolve into another phase or phases, the recloser control method recognizes this condition and activates the recloser to those phases of the recloser that are affected (i.e., have a fault). The recloser control recognizes if there is more than one-phase involved (e.g., two-phases or three-phases evolving from the initially detected single-phase fault). Then the present invention initiates a two-phase or three-phase trip and subsequent reclose or lockout because the fault has evolved or is moving from one phase to another, thereby increasing the possibility of equipment damage.

The recloser control technique of the present invention allows an electric utility to prevent costly three-phase outages of their distribution network where catastrophic outages can be attributed to a single-phase transient type fault evolving into a significant two-phase and three-phase fault. The present invention improves the reliability of the electrical power system (e.g., during catastrophic events such as hurricanes, tornadoes, thunderstorms, and earthquakes), thereby minimizing the electrical and mechanical damage to feeder equipment, and thus saving the electric utility time, money, and resources.

In accordance with the present invention, all phases shall operate together rather than with momentary delay from phase-to-phase that may otherwise occur as a result slight timing differences of individual devices.

Thus, the present invention allows all phases to act at the same time, and trips one phase, two phases, or three phases based on fault type. It is contemplated that both tripping and lockout can be implemented on single-phase or two-phase.

For single-phase tripping, two-thirds of outages on line-ground faults are prevented. For example, the controller trips on A phase only, with lockout on that phase only. For two-phase tripping, one-third of outages on line-ground faults are prevented. For example, the controller trips on A and B phases only, with lockout on those phases only. The invention provides better system reliability and continuity of service.

The invention may be embodied in the form of appropriate computer software, or in the form of appropriate hardware or a combination of appropriate hardware and software without departing from the spirit and scope of the present invention. Further details regarding such hardware and/or software should be apparent to the relevant general public. Accordingly, further descriptions of such hardware and/or software herein are not believed to be necessary.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed:

1. A recloser control system for a three-phase electrical power line, comprising:
    a recloser having three poles, each pole corresponding to an associated one of the three phases of the power line and being capable of opening or closing the associated phase of the power line; and
    a recloser controller coupled to the recloser for controlling the setting of the poles depending on the line current appearing in the phases on the power line, one pole opening the associated phase of the power line if the line current on only the associated phase exceeds an associated predetermined current, two poles opening the two associated phases of the power line if the line current on only the two associated phases exceeds an associated predetermined current, and all poles opening all the associated phases of the power line if the line current on three phases exceeds the associated predetermined current, and if only one fault is present, then monitoring the fault to determine if the fault evolves into another phase, and if so, opening only the at fault phases of the recloser, wherein the recloser controller comprises a countdown timer for each faulted phase for determining whether a phase that has entered a pickup state should be tripped.

2. The recloser control system according to claim 1, wherein the recloser controller monitors the three phases of the power line and determines a number of phases in which the line current exceeds the associated predetermined current, wherein controlling the setting of the poles is responsive to the determined number of phases in which the line current exceeds the associated predetermined current.

3. The recloser control system according to claim 1, wherein the recloser controller controls the recloser to at least one of trip, reclose, and lockout responsive to the fault being detected on one phase independently, two phases sequentially, or three phases simultaneously.

4. A computer-readable medium having computer-executable instructions for performing steps comprising:
    monitoring the three phases of the power line;
    determining which of the three phases have an associated fault by detecting a fault in at least one of the three phases, starting a countdown timer associated with each faulted phase, and determining the faults still present after one of the associated countdown timers has expired;
    opening only the phases on the power line that have the associated fault; and
    if only one fault is determined, then monitoring the fault to determine if the fault evolves into another phase, and if so, opening only the at fault phases of the recloser.

5. The computer-readable medium according to claim 4, wherein determining which of the three phases have an associated fault comprises comparing a line current through each of the three phases to a predetermined current, a fault occurring on one of the phases when the line current on the associated phase exceeds the predetermined current.

6. The computer-readable medium according to claim 4, wherein opening the phases on the power line that have the associated fault comprises opening only one phase if only one fault is determined, the only one phase being associated with the fault, opening only two phases if only two faults are determined, the only two phases being associated with the two faults, and opening all three phases if three faults are determined.

7. The computer-readable medium according to claim 4, further comprising computer-executable instructions for controlling the recloser to at least one of trip, reclose, and lockout responsive to the fault being detected on one phase independently, two phases sequentially, or three phases simultaneously.

8. A method for controlling a recloser for a three-phase electrical power line, comprising:
    monitoring the three phases of the power line;
    determining which of the three phases have an associated fault by detecting a fault in at least one of the three phases, starting a countdown timer associated with each faulted phase, and determining the faults still present after one of the associated countdown timers has expired;
    opening only the phases on the power line that have the associated fault; and
    if only one fault is determined, then monitoring the fault to determine if the fault evolves into another phase, and if so, opening only the at fault phases of the recloser.

9. The method according to claim 8, wherein the fault occurs when a protection element on the recloser enters pickup.

10. The method according to claim 8, wherein determining which of the three phases have an associated fault comprises comparing a line current through each of the three phases to a predetermined current, a fault occurring on one of the phases when the line current on the associated phase exceeds the predetermined current.

11. The method according to claim 8, wherein the fault occurs when a protection element on the recloser enters pickup.

12. The method according to claim 8, wherein opening the phases on the power line that have the associated fault comprises opening only one phase if only one fault is determined, the only one phase being associated with the fault, opening only two phases if only two faults are determined, the only two phases being associated with the two faults, and opening all three phases if three faults are determined.

13. The method according to claim 8, further comprising controlling the recloser to at least one of trip, reclose, and lockout responsive to the fault being detected on one phase independently, two phases sequentially, or three phases simultaneously.

* * * * *